I. B. Stanley,
Bean Harvester.
No. 6009. Patented Jan. 9 1849.
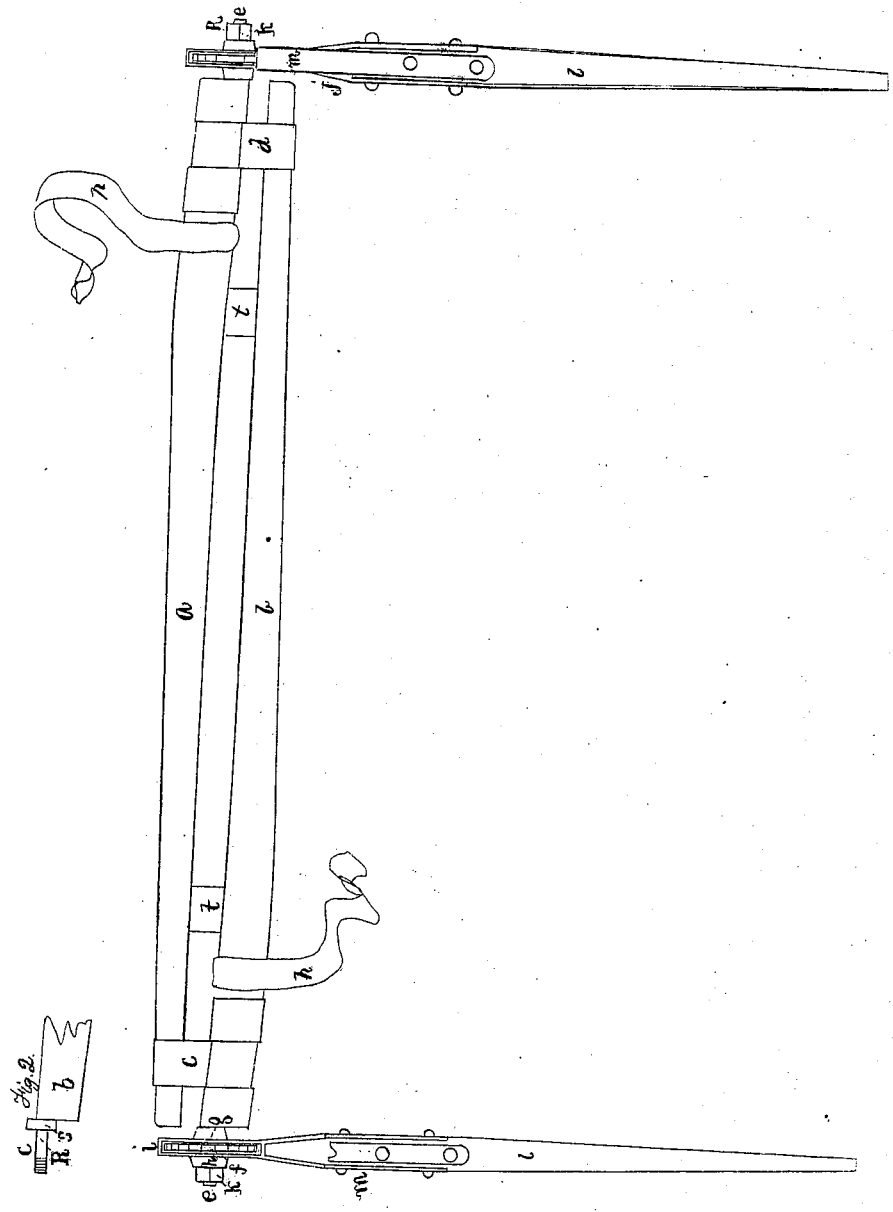

UNITED STATES PATENT OFFICE.

JOHN B. STANLEY, OF COPIAH COUNTY, MISSISSIPPI.

IMPROVEMENT IN MACHINES FOR GATHERING PEA-VINES.

Specification forming part of Letters Patent No. 6,009, dated January 9, 1849.

*To all whom it may concern:*

Be it known that I, JOHN B. STANLEY, of the county of Copiah and State of Mississippi, have invented a new and useful mode of securing pea and other vines for forage, and also a machine for the purpose of gathering them in the field preparatory to securing them; and I do hereby declare that the following is a full, clear, and exact description of the construction and operation of the machine, and also of the manner of securing pea and other vines for forage, reference being had to the annexed drawing, making part of this specification, in which—

$a\ b$ are two beams, made somewhat tapering to facilitate their insertion into or withdrawal from $c\ d$, the stirrups, fixed to the butt-end of each beam. Each beam has projecting from its butt-end $e$ a pivot, of which R, Fig. 2, the square portion, receives $f$, the ratchet-wheel, which has a square eye to fit it. $g$ is a tight collar, and $h$ is a loose collar, both on the pivot $e$. $i$ is a nave or box inclosing the wheel, in whole or in part, to keep it clear of earth, &c. $j$ is the shank of the box $i$, by which it is connected with $l$, the lever. $k$ is a nut, keeping the box $i$ and its inclosed wheel $f$ in their place on the pivot $e$. $m$ is a spring or click attached to the lever, and acts as a catch on the ratchet-wheel. $m^2$ is the same spring, but broken to show the box $i$ in the drawing. $p$ is a strap, of leather or other material, attached to the beam. $t$ is a wedge or block to be used at convenience, as the strap may be made fast without it.

Operation: The small end of each beam being inserted in the stirrup of the other, I drive in the wedges $t$, fastening the loose end of the strap $p$ by the wedges, so as to form loops, into which I introduce a common fence-rail. All being in the field, the ratchet-wheels are placed so as to have the springs upward or forward and the levers nearly erect. A boy at each lever works it backward and forward alternately—that is, one moving backward while the other moves forward—thus giving the combination of beams and fence-rail an onward rolling motion. A third hand following, throws over the beams and rail a few vines, which, from their pliant nature, readily wrap around the beams and rail, and on account of the tangled manner in which they grow one will draw others, so that with a little assistance from the third hand a roll is formed. When vines are enwrapped in the roll, the extricating of them offers but little resistance to the power of the levers; but weeds, as they draw up dirt, must be cut. When a roll is as large as I wish I take my machine apart, leaving the fence-rail in the roll. I then put my apparatus together, using another fence-rail, and proceed as before. The drawing of the beams out of the roll leaves it hollow, so that being put up by the two ends of the rail, under a shelter, it will cure without danger of heat or molding.

What I herein claim as new, and desire to secure by Letters Patent, is—

The mode of securing vines in a green state by putting them up in hollow rolls, made as above described, and also the apparatus for the purpose of gathering vines and forming said rolls, as described in the above specification.

JOHN B. STANLEY.

Attest:
S. R. JONES,
M. W. STANLEY.